US010324753B2

(12) United States Patent
Jain et al.

(10) Patent No.: US 10,324,753 B2
(45) Date of Patent: Jun. 18, 2019

(54) INTELLIGENT REPLICATION FACTOR TUNING BASED ON PREDICTED SCHEDULING

(71) Applicant: CA, Inc., New York, NY (US)

(72) Inventors: Mukul Jain, San Jose, CA (US); Hiren Mansukhlal Mandalia, Cupertino, CA (US)

(73) Assignee: CA, Inc., New York, NY (US)

( * ) Notice: Subject to any disclaimer, the term of this patent is extended or adjusted under 35 U.S.C. 154(b) by 263 days.

(21) Appl. No.: 15/288,046

(22) Filed: Oct. 7, 2016

(65) Prior Publication Data

US 2018/0101399 A1    Apr. 12, 2018

(51) Int. Cl.
*G06F 9/46*  (2006.01)
*G06F 9/48*  (2006.01)
*G06F 9/50*  (2006.01)

(52) U.S. Cl.
CPC ............ *G06F 9/485* (2013.01); *G06F 9/4881* (2013.01); *G06F 9/5033* (2013.01)

(58) Field of Classification Search
None
See application file for complete search history.

(56) References Cited

U.S. PATENT DOCUMENTS

| 2007/0180451 A1* | 8/2007 | Ryan ...................... G06F 9/505 |
| | | 718/104 |
| 2012/0179652 A1* | 7/2012 | Glaude ............. G06F 17/30581 |
| | | 707/626 |
| 2014/0181305 A1* | 6/2014 | Wolf ....................... H04L 67/10 |
| | | 709/226 |
| 2016/0342483 A1* | 11/2016 | Klingenberg ....... G06F 11/1461 |

OTHER PUBLICATIONS

Guo, et al., "Investigation of Data Locality in MapReduce", CCGRID '12 Proceedings of the 2012 12th IEEE/ACM International Symposium on Cluster, Cloud and Grid Computing (ccgrid 2012), May 13, 2012, 8 pages.
Lee, et al., "Efficient Data Replication Scheme based on Hadoop Distributed File System", International Journal of Software Engineering and Its Applications, vol. 9, No. 12, 2015, pp. 177-186.
(Continued)

*Primary Examiner* — Kenneth Tang
(74) *Attorney, Agent, or Firm* — Gilliam IP PLLC

(57) ABSTRACT

A replication factor tuner can use historical data about previous runs of compute jobs to predict execution time periods for jobs scheduled to run in a distributed system, which implements a software framework that utilizes data locality for parallelization of jobs or tasks of the jobs. The replication factor tuner also determines input data sets that are common across the jobs scheduled to run in the distributed system. Based on the predicted execution time periods on commonality of input data sets, the replication factor tuner determines predicted concurrent access of the input data sets by the scheduled compute jobs. The tuner can change replication factors of input data sets that are predicted to be concurrently accessed by a threshold number of the scheduled compute jobs.

20 Claims, 4 Drawing Sheets

(56) References Cited

OTHER PUBLICATIONS

Shaikh, "Increasing the Replications of Data Dynamically with HDFS", Eduonix Learning Solutions Pvt Ltd, [online Blog] retrieved on Aug. 26, 2016 from https://www.eduonix.com/blog/bigdata-and-hadoop/increasing-the-replications-of-data-dynamically-with-hdfs/, Oct. 24, 2015, 12 pages.

Zaharia, et al., "Delay Scheduling: A Simple Technique for Achieving Locality and Fairness in Cluster Scheduling", EuroSys '10 Proceedings of the 5th European conference on Computer systems, Paris, France, Apr. 13, 2010, 14 pages.

Zaharia, et al., "Delay Scheduling: A Simple Technique for Achieving Locality and Fairness in Cluster Scheduling", retrieved on Aug. 26, 2016 from https://people.csail.mit.edu/matei/talks/2010/eurosys_delaysched.pdf, 2010, 26 pages.

\* cited by examiner

INTELLIGENT REPLICATION FACTOR TUNING BASED ON PREDICTED SCHEDULING

BACKGROUND

The disclosure generally relates to the field of data processing, and more particularly to virtual machine task or process management or task management/control.

Massively scalable, distributed file systems and the MapReduce programming paradigm have been developed to store, organize, and analyze the massive volumes of data (terabytes to petabytes) being generated. A massively scalable, distributed file system (e.g., the Hadoop® distributed file system) provides fault tolerance despite the data being stored on thousands of machines made of inexpensive, commodity hardware that is likely unreliable. Analysis of this data may be for search indexing, bioinformatics, genomics, data mining, machine learning, etc. Analysis for any one of these purposes can involve computationally complex processing of large data sets (e.g., multi-gigabyte file sizes). The MapReduce programming paradigm was developed for processing very large data sets distributed across a cluster of machines that can number in the thousands. This programming paradigm conceals the complexity of distributed systems and parallelization while allowing use of the resources of a distributed system.

To implement a MapReduce paradigm, a map function and a reduce function are written for an application for a MapReduce framework. A MapReduce framework provides a library of the MapReduce functionality for partitioning input data and parallelizing tasks on partitioned data that is not specific to an application. An application submits a job for scheduling on a cluster of machines on which a MapReduce framework is deployed. Using the MapReduce framework, the job is decomposed into a set of map tasks and reduce tasks that correspond to a user-defined map function and user-defined reduce function, respectively. These user-defined functions are defined based on the MapReduce framework. The MapReduce framework partitions the input data into smaller chunks of the input data. Multiple instances of the MapReduce framework are instantiated in the cluster. A master instance assigns map tasks to idle worker instances. A "mapper" (worker instance assigned a map task) reads an assigned chunk and parses key/value pairs out of the chunk. The mapper then passes each key/value pair to the user-defined map function, which filters and aggregates the key/value pairs to produce intermediate key/value pairs. The master instance assigns partitions of the intermediate key/value pairs to reducers (idle worker instances assigned reduce tasks). A reducer reads a partitioned set of intermediate key/value pairs ("region") and sorts the pairs by the intermediate keys to group the data. The reducer then passes each unique intermediate key and corresponding grouped values to the user-defined reduce function, which carries out the processing for the job.

BRIEF DESCRIPTION OF THE DRAWINGS

Embodiments of the disclosure may be better understood by referencing the accompanying drawings.

DESCRIPTION

Figure 1:
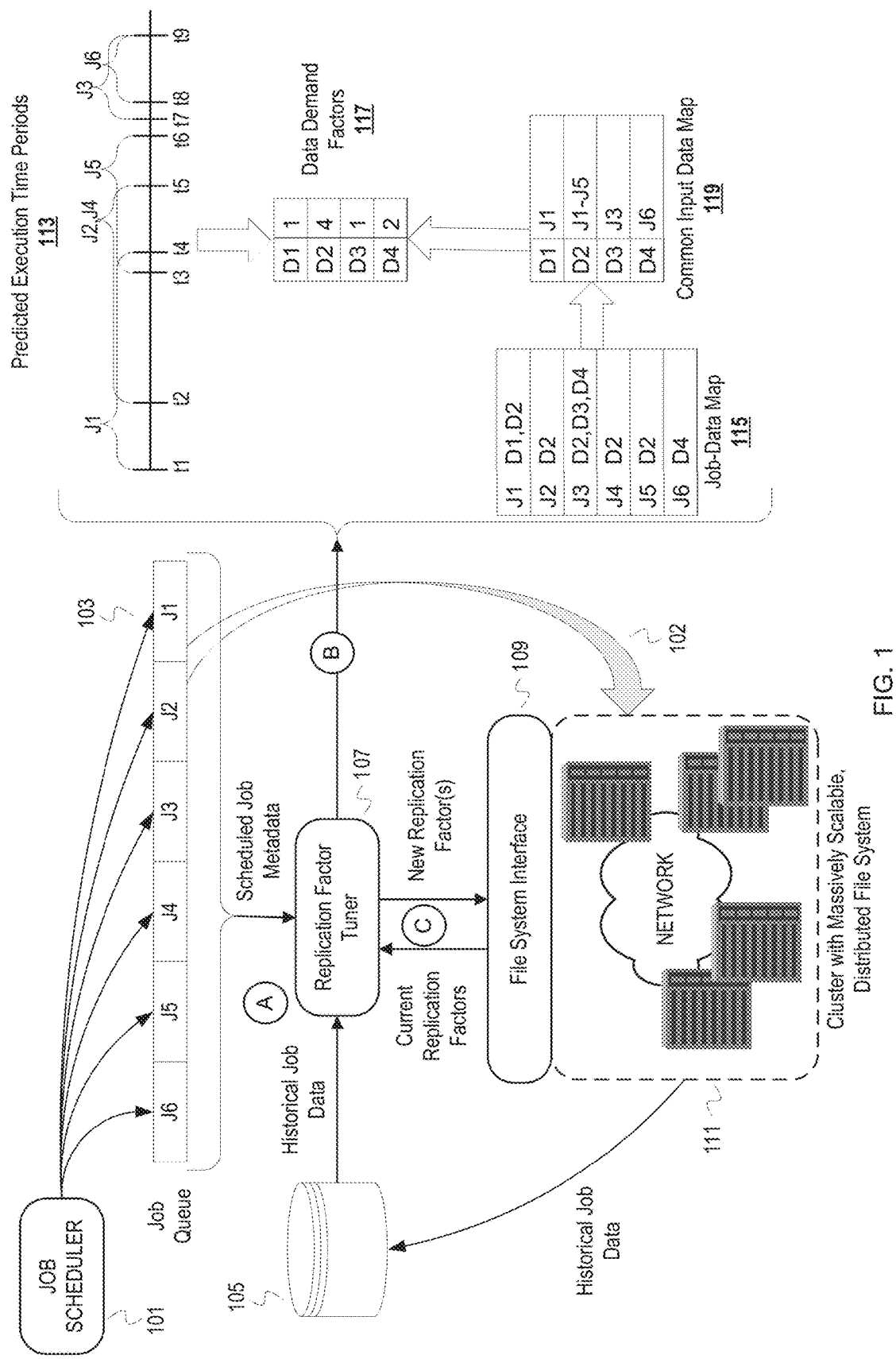
FIG. 1 is a conceptual diagram of a replication factor tuner tuning replication factor(s) for input data of compute jobs scheduled to execute in a compute cluster.

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Terminology

The description uses the term "job." A job is defined to be a set of one or more programs and input data to be manipulated by the set of one or more programs. The complete description of a job may be described with a job control language to specify how the job is to be run. In this description, a job does not necessarily include the input data to be manipulated by the set of programs. A job in this description refers to the set of one or more programs and indications (e.g., pathnames, locations, etc.) of input data to be manipulated by the set of one or more programs. This does not exclude a job being a set of one or more programs, data to be manipulated, and indications of data to be manipulated.

Overview

Massively scalable, distributed file systems ("DFS") can provide fault tolerance through redundancy. The degree of redundancy for data in a DFS can be configured, and typically defaults to three. A program ("replication factor tuner") can be designed to dynamically adjust the degree of redundancy ("replication factor") to increase the likelihood of "data locality" for a scheduled compute job. Data locality refers to the proximity of data to the executing program code ("task") that will process the data. A MapReduce system (a system that implements a MapReduce framework) attempts to assign tasks to machines that are near the data that will be processed by the task. Proximity can be local (e.g., the data is stored on a storage device installed on the machine to carry out the task) and can be near (e.g., the data is stored on a device within a same rack as the machine to carry out the task).

To increase the likelihood of data locality for scheduled jobs, a replication factor tuner adjusts the replication factor for data to be processed by jobs based on input data for the scheduled jobs and predicted execution time periods of the scheduled jobs. The replication factor tuner analyzes metadata of scheduled jobs to identify the jobs and the input data for the jobs. The optimizer also obtains historical job execution data about the scheduled jobs, such as job duration and past start times. With the historical job execution data, the replication factor tuner predicts execution time periods for which the scheduled jobs will execute. Based on the predicted execution time periods, the replication factor tuner determines input data that will be concurrently accessed by the scheduled jobs. The replication factor tuner then tunes the replication factors of the input data based on the determined concurrent accessing and current replication factors of the input data, which should increase data locality and parallelization of tasks.

Example Illustrations

FIG. 1 is a conceptual diagram of a replication factor tuner tuning replication factor(s) for input data of compute jobs scheduled to execute in a compute cluster. A machine cluster 111 ("cluster") can comprise thousands of servers, storage devices, etc. A massively scalable, distributed file system is implemented on the cluster 111. The cluster 111 provides a MapReduce framework used by jobs run in the cluster 111. Examples of MapReduce frameworks include Hadoop MapReduce, Spark, and Disco. The cluster 111 also provides access to operations of the distributed file system via a file system interface 109. The interface 109 accepts function calls defined by an application programming interface of the distributed file system. The cluster 111 provides a service of storing data and executing jobs scheduled by a job scheduler 101. The cluster 111 generates data about job executions and stores the historical job data into a repository 105, or some other destination specified by the owner of the jobs. For instance, a MapReduce service(s) in the cluster 111 writes the historical job data to a specified location. The job scheduler 101 schedules jobs in a job queue 103. These jobs can be various application jobs (e.g., page crawling, document indexing, machine learning, etc.) and can execute at various frequencies (e.g., daily, weekly, monthly, etc.). These jobs can be submitted to the MapReduce service(s) in the cluster 111 via an interface as conceptually depicted with the curved arrow 102.

FIG. 1 is annotated with a series of letters A-C. These represent stages of operations, each of which can comprise one or more operations. Although these stages are ordered for this example, the stages illustrate one example to aid in understanding this disclosure and should not be used to limit the claims. Subject matter falling within the scope of the claims can vary with respect to the order and some of the operations.

At stage A, a replication factor tuner 107 obtains data to predict execution time periods of scheduled compute jobs and determine concurrent access of input data among the scheduled compute jobs. This data used by the replication factor tuner 107 includes job schedule metadata and historical job data. The replication factor tuner 107 obtains metadata about the scheduled jobs in the job queue 103. The job schedule metadata identifies the jobs (e.g., job names, unique identifiers of processes or applications, owners of the jobs, etc.) and indicates input data for each of the scheduled jobs (e.g., filenames, pathnames, object identifiers, etc.). The job schedule metadata may also indicate priorities among the scheduled jobs, dependencies among the scheduled jobs, service level objectives, and other information describing attributes of the jobs and/or entities requesting the scheduled jobs that can influence execution of the jobs. The replication factor tuner 107 obtains the historical job data from the repository 105. Obtaining the historical job data can involve different operations depending upon how the historical job data is stored. The historical job data may be organized by job identifier in a file system (e.g., job data can be written to a file path derived from a job identifier). The historical job data may be in a database indexed by job identifier. The historical job data indicates duration of jobs run in the cluster 111, start times of jobs that have run in the cluster 111, and frequency of executions per job within the cluster 111. The historical job data can also indicate other information including information about performance and resource consumption. For example, the historical job data can indicate the input data for past jobs and replication factors of those input data.

With this obtained information, replication factor tuner 107 creates a job-data map 115 and predicted execution time periods data 113. The replication factor tuner 107 can create the job-data map 115 from the job schedule metadata. The job-data map 115 identifies input data for each scheduled job. In this example, the job J1 has input data D1 and D2; the jobs J2, J4, and J5 have input data D2; the job J3 has input data D2-D4, the job J6 has input data D6. With the historical job data, the replication factor tuner 107 can create predicted execution time periods data 113.

At stage B, the replication factor tuner 107 determines demand on the input data of the scheduled compute jobs. The replication factor tuner 107 determines overlapping execution time periods among the scheduled compute jobs based on the predicted execution time periods 113. The replication factor tuner 107 then determines data demand factors 117 based on the overlapping execution time periods among the scheduled compute jobs and a common input data map 119. The replication factor tuner 107 derives from the common input data map 119 from the job-data map 115 effectively inverting the job-data map. In other words, the replication factor tuner 107 determines, for each input data, the scheduled compute jobs that will manipulate the input data. The predicted execution time periods data 113 indicates overlapping execution time periods for scheduled jobs J1, J2, J4, and J5. The predicted execution time periods data 113 indicates overlapping execution time periods for the jobs J3 and J6. The replication factor tuner 107 can determine with common input data map 119 that the jobs J1-J5 have common input data D2 and that the jobs J3 and J6 have common input data D4. Since the jobs J1, J2, J4, and J5 have been predicted to have overlapping execution time periods, then the replication factor tuner 107 predicts that these jobs will concurrently access the input data D2. The replication factor tuner 107 sets the data demand factor for the input data D2 to 4 since 4 scheduled compute jobs are predicted to concurrently access the input data D2. The replication factor tuner 107 sets the data demand factor for the input data D4 as 2 since two scheduled jobs (J3 and J6) have the input data D4 in common and have predicted overlapping execution time periods.

At stage C, the replication factor tuner 107 tunes the replication factor in the cluster 111 for the input data D2 based on the data demand factors 117 and currently set replication factors for the input data. The replication factor tuner 107 obtains the current replication factors for the input data D1-D4 from the cluster 111. The replication factor tuner 107 can invoke a function via the interface 109 that causes the cluster (i.e., a service or process associated with the cluster 111) to return the current replication factors for the identified input data. Since the data demand factors for the input data D1 and D3 are one, the replication factor tuner 107 need not obtain their replication factors. The replication factor tuner 107 may also skip obtaining the current replication factor for the input data D4 if the data demand factor for D4 falls below a threshold set in the replication factor tuner 107 for tuning. For instance, a threshold for tuning can be set to three based on a default replication factor of three within the cluster 111. Assuming a default replication factor of three in the cluster 111, the replication factor tuner 107 will tune the replication factor for the input data D2 to increase it to four and increase the likelihood of parallelization and data locality for the scheduled compute jobs predicted to concurrently access the input data D2. However, the replication factor tuner 107 would not tune the replication factor of the input data D4 since it is less than the default of three. Tuning can also be influenced by state of the cluster and overhead incurred from tuning replication factors. Assuming the demand factor for D4 exceeds a specified minimum threshold, the replication factor tuner 107 may delay tuning the replication factor for the input data D4 upon determining that the replication factor for D2 will be increased to reduce impact on the cluster. Since increasing the replication factor for data in the cluster 111 incurs replication overhead that will vary with the extent of tuning (e.g., degree of increase of a replication factor and size of corresponding input data), the change can be delayed until an opportunity arises before any one of the jobs J1-J4 begin executing in the cluster 111 that reduces impact on performance of the cluster.

The creation of both maps 115 and 119 is depicted for this example illustration of FIG. 1 and should not be considered a necessity. A replication factor tuner can create a data structure based on the metadata of scheduled compute jobs that indicates the relationship of input data to compute jobs in either direction instead of both.

Figure 2:
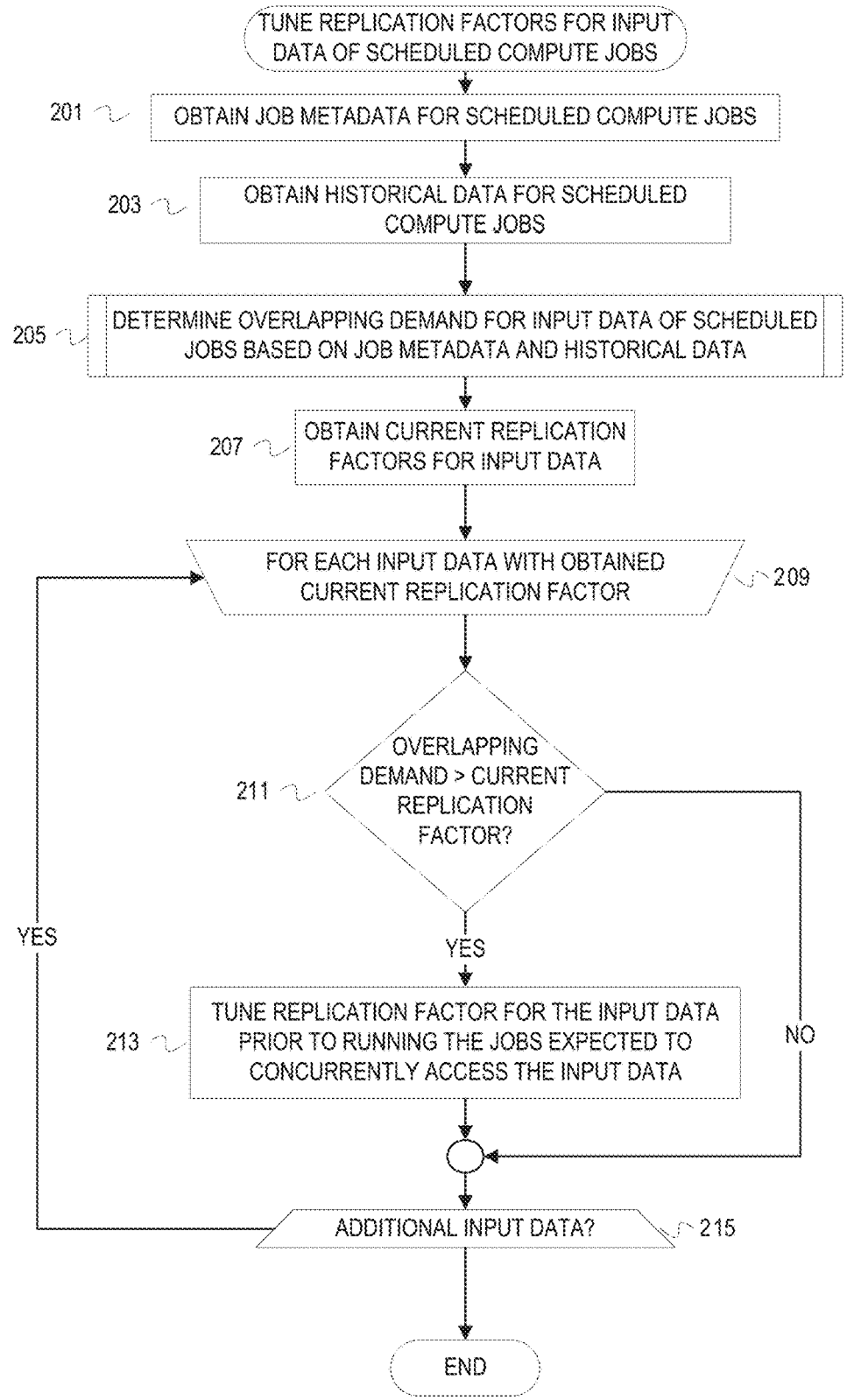
FIG. 2 is a flowchart of example operations for tuning replication factors for input data of scheduled compute jobs.

FIG. 2 is a flowchart of example operations for tuning replication factors for input data of scheduled compute jobs. FIG. 2 refers to a tuner performing the operations as a shorthand form of the replication factor tuner of FIG. 1. The example operations of FIG. 2 adjust replication factors of input data common across scheduled jobs predicted to have overlapping execution time periods.

A tuner obtains job metadata for scheduled compute jobs (201). A tuner monitors a queue of scheduled jobs. The tuner can request metadata for the scheduled jobs in the queue or receive the metadata pushed from a job scheduler. The tuner obtains the metadata at regular intervals and/or when n new jobs are enqueued. For instance, the tuner may monitor the queue and detect when a new job is scheduled. Every 3 newly queued compute jobs, the tuner can obtain the metadata for the newly queued jobs. The tuner can also accumulate metadata of scheduled compute jobs and begin tuning operations after a threshold number of compute jobs have been scheduled.

The tuner also obtains historical data for the scheduled compute jobs (203). The tuner can retrieve the historical data from a predefined location. If the historical data is aggregated across multiple jobs into a file, then the tuner parses the historical data file for the historical data of the scheduled compute jobs. Historical data may be written to files with filenames and/or written to paths with pathnames derived from the job identifiers. Thus, the tuner can search for the files or search for the paths based on the identifiers of the scheduled compute jobs, which would be indicated in the obtained metadata.

The tuner determines overlapping demand for input data of the scheduled compute jobs based on the obtained metadata and the obtained historical data (205). To determine the overlapping demand or concurrent access of input, the tuner determines execution time periods of the scheduled compute jobs and the input data of each of the scheduled compute jobs. With the predicted execution time periods and the input data of each of the scheduled compute jobs, the tuner can predict input data that will be concurrently accessed by multiple of the scheduled compute jobs.

The tuner then obtains the current replication factors for the input data of the scheduled compute jobs (207). To obtain the current replication factors, the tuner can invoke a function defined for the distributed file system that hosts the input data. Examples of distributed file systems include the Google® File system, the Hadoop® Distributed File System, the Lustre® file system, the Ceph® file system, and General Parallel File System. In some cases, the distributed file system can maintain a database or store of the replication factors that is accessible to the tuner without a file system call. The tuner does not necessarily obtain the current replication factor for all of the input data of the scheduled compute jobs. The tuner can disregard input data that is not common across a threshold number of the scheduled compute jobs. This threshold ("demand threshold") can be set to synchronize with a default replication factor of the file system. The demand threshold can also adapt to changing goals of performance versus storage capacity. For instance, the demand threshold can increase when storage capacity is low and storage capacity is prioritized over performance objectives. The demand threshold can decrease when storage capacity is high and performance objectives are prioritized.

After determining the expected overlapping demand on input data and obtaining the current replication factors, the tuner begins to evaluate the input data for tuning (209). The tuner determines, for each of the input data for which a current replication factor was obtained, whether the overlapping demand on the input data is greater than the current replication factor for the input data (211). If the overlapping demand is not greater than the current replication factor, then the tuner proceeds to the next input data, if any (215). If the overlapping demand is greater, then the tuner tunes the replication factor for the input data (213).

The tuner tunes the replication factor for the input data prior to the jobs predicted to concurrently access the input data running (213). As mentioned in FIG. 1, the tuner can change the replication factor by calling a file system operation that sets the replication factor to a value specified in the function call. As also mentioned in FIG. 1, the timing of the change is based on predicted start times of the overlapping jobs and state of the cluster. The tuner can interact with a resource management/monitoring application of the cluster to determine a time of low activity in the cluster prior to start of the overlapping jobs and request the replication factor setting during the time period of low activity. The tuner can be programmed to request the change opportunistically assuming an ongoing or at least periodic update of state information about the cluster or be programmed to schedule the request to set the replication factor based on a predicted low activity in the cluster, which is predicted using the historical job data. Although the tuner may be able to tune the replication factor prior to start of all of the jobs that will concurrently access the input data, the tuner does not necessarily do so. A number of overlapping jobs less than the current replication factor may start significantly before others of the overlapping jobs. With this possibility, the tuner can be programmed to time tuning up to a last opportunity which may occur prior to a particular one of the overlapping jobs that starts after other ones of the overlapping jobs. The tuner may also refine the tuning based on storage capacity, job prioritization, a configured replication factor ceiling, etc. For instance, the tuner may determine that a demand factor for an input data is 9 and the current replication factor is 3. However, a ceiling may be defined to avoid overconsumption of storage capacity by a single file or set of files. Thus, the tuner can reduce the replication factor to the ceiling or have the configured ceiling programmed into the initial determination (e.g., if demand factor is greater than current replication factor then new replication factor is lesser of demand factor and replication factor ceiling. After tuning the replication factor, the tuner proceeds to the next input data to be tuned, if any (215).

Figure 3:
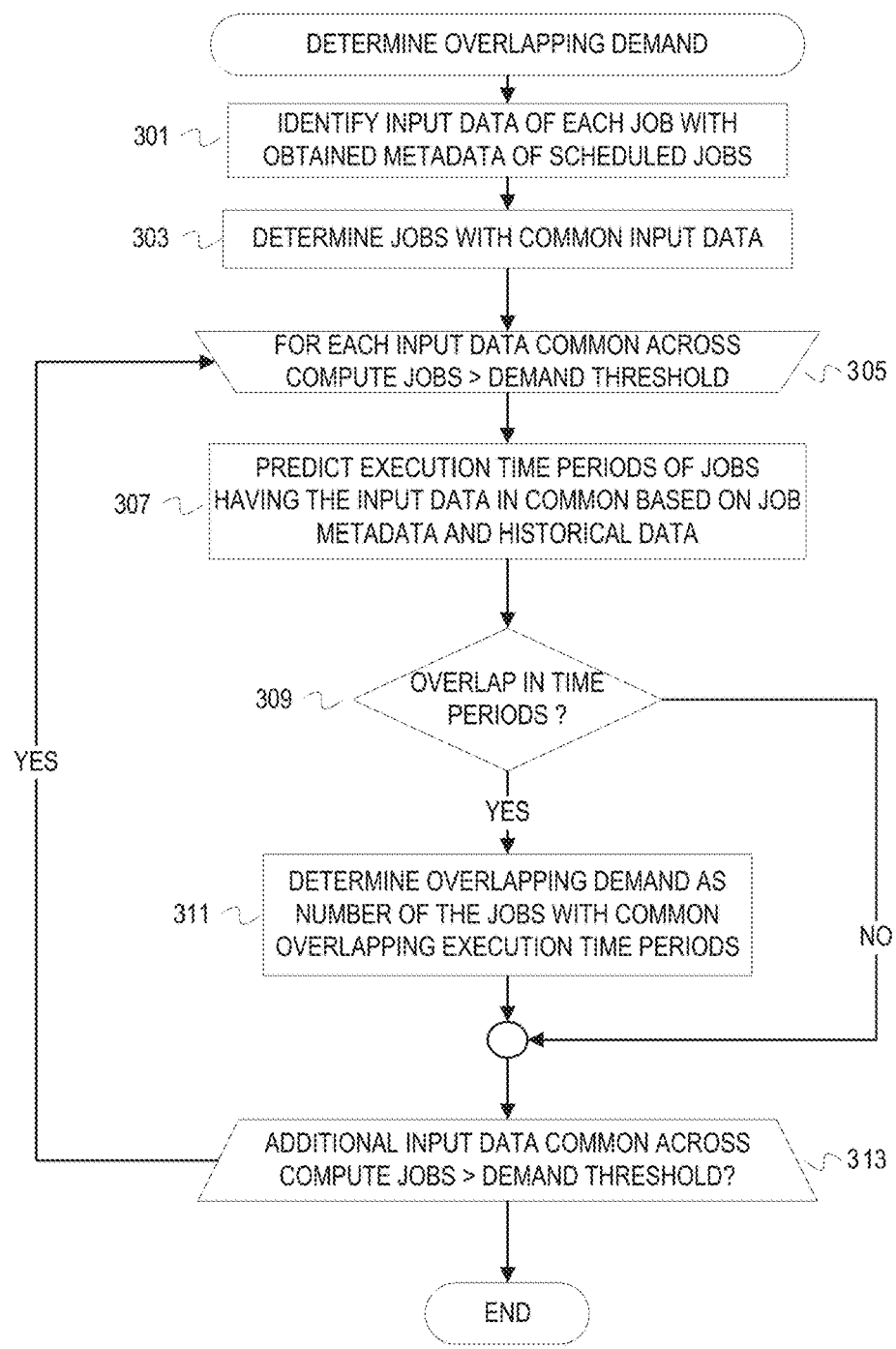
FIG. 3 is a flowchart of example operations for determining overlapping demand.

FIG. 3 is a flowchart of example operations for determining overlapping demand. FIG. 2 included an example operation (205) that determined overlapping demand for input data of scheduled jobs based on job metadata and historical job data. The example operations of FIG. 3 analyze the obtained data, both job schedule metadata and historical job metadata, to predict which of the input data will be concurrently accessed by multiple of the scheduled compute jobs and the number of concurrently accessing jobs.

The tuner identifies the input data of each of the scheduled compute jobs with the obtained metadata of the scheduled compute jobs (301). The metadata indicates input data for each of the scheduled compute jobs. The particular technique for indicating input data will vary depending upon the distributed file system. The metadata may indicate input data with a combination of filename and pathname, with an object identifier, with an inode number, or with a pathname and no filename. The metadata may indicate input data with a location, such as a network address, uniform resource locator, etc. In addition, input data can be identified with a pathname, URL, network address, etc. to identify a collection of input data to be manipulated by a job (e.g., all files in a specified directory will be processed by the job).

After identifying the input data, the tuner determines the scheduled compute jobs with common input data (303). With the scheduled compute job metadata, the tuner can determine which identified input data are common across multiple scheduled compute jobs. The tuner can create a listing of the identified input data and examine the metadata of the scheduled compute jobs to identify, for each of the identified input data, those of the scheduled compute jobs that will manipulate the input data.

The tuner then begins to analyze the historical job data based on each input data that is common across a number of compute jobs greater than a demand threshold to predict concurrent access of the input data (305). As the tuner determines common input data (303), the tuner can maintain a counter for each input data by incrementing the counter for each compute job that will process the input data. Each input data with a counter greater than the demand threshold is evaluated for tuning. Evaluating an input data involves analyzing the historical job data of the jobs that have the input data in common. The tuner analyzes the historical job data to predict execution time periods of the jobs that have the input data in common (307). A predicted execution time period at least includes a predicted start time and a predicted end time for a job. The analysis involves the tuner determining from the historical job data the job execution durations ("job durations") of the jobs having the input data in common. If the compute job metadata indicates scheduled start times, the tuner can predict execution time periods with the scheduled start times and the job historical job data. Even though the start times may be specified in the metadata, the tuner may still "predict" execution time periods based in historical start times of the jobs that show a deviation from the scheduled start time. For instance, a job may be scheduled for 7:00 PM every Saturday. But the historical data may indicate that the job frequently starts at a different time (e.g., 7:10 PM or 6:55 PM). If the metadata does not specify a start time for a job, then the tuner can predict the execution time period for the job with the history of start times for the job as well as the job duration from the historical job data. The tuner can also use other information from the metadata, such as priority of the jobs with respect to other jobs within the scheduled compute job queue.

With the predicted execution time periods of the jobs having the input data in common, the tuner can determine overlap among the jobs (309). If there is no overlap among the jobs, then the tuner can proceed with a next input data common across a number of scheduled compute jobs exceeding the demand threshold (313).

If there is overlap among the jobs having the input data in common, then the tuner determines the overlapping demand on the input data as the number of jobs with the same overlapping execution time periods (311). The tuner compares execution time periods for each pairing of jobs that have the input data in common. The tuner can compare predicted start times of a pair of jobs having the input data in common and predicted end times against conditionals that define overlap between the execution time periods. For example, a conditional may be, "Based on the predicted start and end times, does either start before the other finishes." The tuner can also track the predicted start and end times of the overlap for each pairing of jobs, and compare those to determine common overlap among the jobs. The overlapping demand will be the greatest number of compute jobs with common overlap in execution time periods. To illustrate, jobs A-F may have input data in common. Job F may not have any overlap in predicted execution time period with the other jobs. Jobs A-C may have a common overlap in predicted execution time periods and jobs C-E may have common overlap in predicted execution time periods. So, jobs D-E are predicted to start after jobs A-B end. Thus, the greatest number of common overlap in that scenario is 3, which will be the overlapping demand. After determining the overlapping demand, the tuner proceeds to a next input data common across a number of scheduled compute jobs exceeding the demand threshold, if any (313).

The names "tuner" and "replication factor tuner" are logical constructs to identify the general functionality of program code that comports with this disclosure and not intended to restrict any claim to a particular function or method named "tuner" or "replication factor tuner." Programmers can name program code arbitrarily and specific implementation of the functionality can vary by platform, hardware, programming language, etc., but the claims and this disclosure describe the specific functionality of executed/interpreted program code and/or configurable hardware (e.g., an application specific integrated circuit) that allow for intelligent tuning of replication factors based on predicted concurrent access of common input data by multiple scheduled compute jobs. Furthermore, program code that comports with this disclosure can be a standalone program that communicates with a job scheduler and an application that provides historical job data; can be an extension or plug-in to an application that monitors and/or manages a distributed system; can be a plug-in or extension to a job scheduler; can be incorporated into a job scheduler; and can be incorporated into an application that manages and/or monitors a distributed system.

Variations

FIG. 2 depicts operations that schedule tuning of a replication factor after each determination of whether the replication factor for an input data should be tuned. Embodiments can determine replication factor adjustments (i.e., new replication factors) for input data to be concurrently accessed by a number of jobs greater than the current replication factor and store those adjustments/new replication factors into memory. The tuning (i.e., changing the replication factor) can be scheduled after determining the adjustments. This can allow the tuner (or another related program) to evaluate impact across multiple replication factor tunings. For instance, it may be determined that multiple tunings can be requested concurrently without violating any service level objectives of the hosting cluster. Or it may be determined that all determined tunings cannot be done within the available time period prior to the relevant compute jobs running. In this case of insufficient time, other information about the scheduled compute jobs (e.g., priority, job owner, etc.) can be used to reduce a replication factor tuning or eliminate a tuning for an input data. The inability to tune some replication factors can be logged and used to adjust the timing of the tuner. For example, the tuner can decrease a window (time or compute job number) for triggering evaluation of scheduled jobs for tuning replication factors.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
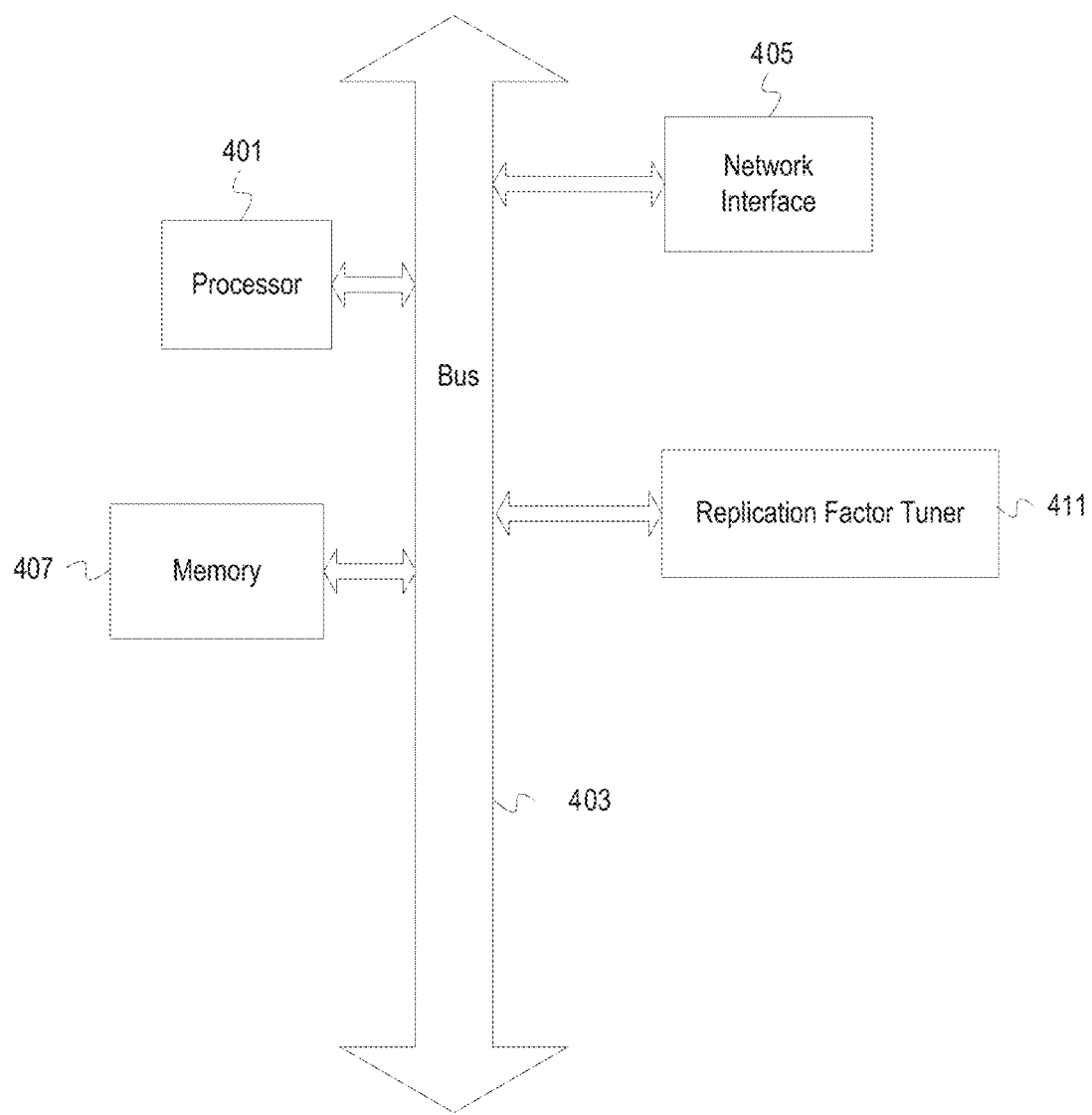
FIG. 4 depicts an example computer system with a replication factor tuner.

FIG. 4 depicts an example computer system with a replication factor tuner. The computer system includes a processor 401 (possibly including multiple processors, multiple cores, multiple nodes, and/or implementing multithreading, etc.). The computer system includes memory 407. The memory 407 may be system memory (e.g., one or more of cache, random access memory, read only memory, etc.) or any one or more of the above already described possible realizations of machine-readable media. The computer system also includes a bus 403 (e.g., communication bus, system bus, etc.) and a network interface 405 (e.g., a Fiber Channel interface, an Ethernet interface, SONET interface, wireless interface, etc.). The system also includes a replication factor tuner 411. The replication factor tuner 411 predicts execution time periods for jobs scheduled to run in a distributed system that implements a software framework that utilizes data locality for parallelization of jobs or tasks decomposed from the jobs. Based on the predicted execution time periods, the replication factor tuner 411 can change replication factors of input data sets that are predicted to be concurrently accessed by a threshold number of the scheduled compute jobs. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for intelligently tuning replication factor of input data based on predicted concurrent access of the input data by scheduled compute jobs as described herein may be implemented with facilities consistent with any hardware system or hardware systems. Many variations, modifications, additions, and improvements are possible.

Plural instances may be provided for components, operations or structures described herein as a single instance.

Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    identifying input data for each of a plurality of scheduled compute jobs;
    predicting a set of one or more of the input data to be accessed concurrently by multiple of the plurality of scheduled compute jobs based on metadata of the plurality of scheduled compute jobs and historical execution data of the plurality of scheduled compute jobs;
    for each of the set of one or more input data predicted to be accessed concurrently by multiple of the plurality of scheduled compute jobs,
        determining a demand factor for the input data based, at least in part, on a number of the plurality of scheduled compute jobs predicted to access the input data concurrently;
        determining a replication factor currently set for the input data; and
        tuning the replication factor based, at least in part, on the demand factor assigned to the input data satisfying a threshold for tuning.

2. The method of claim 1, wherein tuning the replication factor comprises:
    changing the replication factor based on the number of the plurality of scheduled compute jobs to access the input data concurrently.

3. The method of claim 2 further comprising:
    determining a ceiling limit for the replication factor, wherein changing the replication factor is also based on the ceiling limit.

4. The method of claim 1, wherein the input data is stored within a distributed file system and wherein tuning the replication factor comprises invoking a function defined by an interface for the distributed file system on a cluster of machines.

5. The method of claim 1 wherein predicting the set of one or more of the input data to be accessed concurrently by multiple of the plurality of scheduled compute jobs comprises:
    determining execution durations of the plurality of scheduled compute jobs based on the historical execution data;
    predicting start times of the plurality of scheduled compute jobs based on the historical execution data;
    determining execution time periods and overlap among the execution time periods based on the predicted start times and execution durations; and
    determining the input data of those of the plurality of scheduled compute jobs with overlap of corresponding ones of the execution time periods.

6. The method of claim 1, wherein predicting the set of one or more of the input data to be accessed concurrently by multiple of the plurality of scheduled compute jobs comprises:
    determining execution durations of the plurality of scheduled compute jobs based on the historical execution data;
    determining scheduled start times of the plurality of scheduled compute jobs based on the metadata of the plurality of scheduled compute jobs;
    determining execution time periods and overlap among the execution time periods based on the scheduled start times and execution durations; and
    determining the input data of those of the plurality of scheduled compute jobs with overlap of corresponding ones of the execution time periods.

7. The method of claim 1, wherein tuning the replication factor, for each of the set of one or more input data predicted to be accessed concurrently by multiple of the plurality of scheduled compute jobs, based on the number of the plurality of scheduled compute jobs to access the input data concurrently comprises changing the replication factor to the number if the number is greater than the currently set replication factor.

8. The method of claim 7 further comprising:
    estimating a time overhead for changing the replication factor; and
    wherein changing the replication factor comprises changing the replication factor at a time prior to start of those of the plurality of scheduled compute jobs that will concurrently access the input data and based on the time overhead.

9. The method of claim 1 further comprising obtaining the metadata of the plurality of scheduled compute jobs, wherein the metadata comprises job schedule metadata.

10. One or more non-transitory machine-readable media comprising program code for intelligently tuning replication factors of input data sets, the program code to:
    identify input data sets of a plurality of scheduled compute jobs;
    determine which of the input data sets is common across multiple of the plurality of scheduled compute jobs;
    predict execution time periods for those of the plurality of scheduled compute jobs having common input data sets based, at least in part, on historical job data of the plurality of scheduled compute jobs;
    determine overlap among the predicted execution time periods; and
    tune replication factors of the input data sets that are common across multiple of the plurality of compute jobs determined to have overlap in the predicted execution time periods.

11. The machine-readable media of claim 10 further comprising program code to determine which of the input data sets is common across a number of compute jobs that exceeds a threshold, wherein the program code to predict execution time periods comprises the program code to predict execution time periods for those of the plurality of scheduled compute jobs having in common those of the input data sets common across the number of compute jobs that exceeds the threshold.

12. The machine-readable media of claim 10 further comprising program code to determine, for each input data set that is common across multiple of the plurality of compute jobs, a number of the compute jobs that have the input data set in common that also have common overlap in execution time periods, wherein the program code to tune the replication factors of the input data sets comprises the program code to tune the replication factors of those of the input data sets that are common to a number of compute jobs, which have common overlap in predicted execution time periods, greater than a tuning threshold.

13. An apparatus comprising:
a processor; and
a machine-readable medium comprising program code executable by the processor to cause the apparatus to,
identify input data for each of a plurality of scheduled compute jobs;
predict a set of one or more of the input data to be accessed concurrently by multiple of the plurality of scheduled compute jobs based on metadata of the plurality of scheduled compute jobs and historical execution data of the plurality of scheduled compute jobs;
for each of the set of one or more input data predicted to be accessed concurrently by multiple of the plurality of scheduled compute jobs,
determine a demand factor for the input data based, at least in part, on a number of the plurality of scheduled compute jobs predicted to access the input data concurrently;
determine a replication factor currently set for the input data; and
tune the replication factor based, at least in part, on the demand factor assigned to the input data satisfying a threshold for tuning.

14. The apparatus of claim 13, wherein the program code to tune the replication factor comprises program code to:
change the replication factor based on the number of the plurality of scheduled compute jobs to access the input data concurrently.

15. The apparatus of claim 14, wherein the machine-readable medium further comprises program code executable by the processor to cause the apparatus to:
determine a ceiling limit for the replication factor, wherein changing the replication factor is also based on the ceiling limit.

16. The apparatus of claim 13, wherein the input data is stored within a distributed file system and wherein the program code to tune the replication factor comprises program code to invoke a function defined by an interface for the distributed file system on a cluster of machines.

17. The apparatus of claim 13, wherein the program code to predict the set of one or more of the input data to be accessed concurrently by multiple of the plurality of scheduled compute jobs comprises program code to:
determine execution durations of the plurality of scheduled compute jobs based on the historical execution data;
predict start times of the plurality of scheduled compute jobs based on the historical execution data;
determine execution time periods and overlap among the execution time periods based on the predicted start times and execution durations; and
determine the input data of those of the plurality of scheduled compute jobs with overlap of corresponding ones of the execution time periods.

18. The apparatus of claim 13, wherein the program code to predict the set of one or more of the input data to be accessed concurrently by multiple of the plurality of scheduled compute jobs comprises program code to:
determine execution durations of the plurality of scheduled compute jobs based on the historical execution data;
determine scheduled start times of the plurality of scheduled compute jobs based on the metadata of the plurality of scheduled compute jobs;
determine execution time periods and overlap among the execution time periods based on the scheduled start times and execution durations; and
determine the input data of those of the plurality of scheduled compute jobs with overlap of corresponding ones of the execution time periods.

19. The apparatus of claim 13, wherein the program code to tune the replication factor, for each of the set of one or more input data predicted to be accessed concurrently by multiple of the plurality of scheduled compute jobs, based on the number of the plurality of scheduled compute jobs to access the input data concurrently comprises program code executable by the processor to cause the apparatus to change the replication factor to the number if the number is greater than the currently set replication factor.

20. The apparatus of claim 19, wherein the machine-readable medium further comprises program code executable by the processor to cause the apparatus to:
estimate a time overhead for changing the replication factor; and
wherein changing the replication factor comprises changing the replication factor at a time prior to start of those of the plurality of scheduled compute jobs that will concurrently access the input data and based on the time overhead.

* * * * *